United States Patent [19]

Sasaki et al.

[11] Patent Number: 4,630,634
[45] Date of Patent: Dec. 23, 1986

[54] SOLID CHLORINE DISPENSER FOR SPAS

[75] Inventors: Isao Sasaki, Altadena; Michael L. Schuman, Walnut, both of Calif.

[73] Assignee: Rainbow Lifegard Products, Inc., El Monte, Calif.

[21] Appl. No.: 803,635

[22] Filed: Dec. 2, 1985

[51] Int. Cl.⁴ .................... B01D 11/02; B01F 1/00
[52] U.S. Cl. ...................... 137/268; 422/265
[58] Field of Search ............ 137/268; 422/265, 264, 422/264 B

[56] References Cited

U.S. PATENT DOCUMENTS

| | | | |
|---|---|---|---|
| 2,826,484 | 3/1958 | Buehler | 422/265 |
| 3,598,536 | 8/1971 | Christensen | 422/264 B |
| 3,607,103 | 9/1971 | Kiefer | 422/264 B |
| 3,677,711 | 7/1972 | Bond | 422/264 B |
| 4,217,331 | 8/1980 | Schaub | 422/265 |

*Primary Examiner*—Alan Cohan
*Attorney, Agent, or Firm*—Christie, Parker, & Hale

[57] ABSTRACT

A chlorine dispenser for spas includes a tubular container disposed within a sleeve having one closed end. The container and sleeve form a chamber for receiving the solid chlorine source. The sleeve contains apertures for providing access by water to the solid chlorine source. The sleeve is axially movable along the container, and a locknut engages the container to secure a given position of the sleeve. The container is attached to a foam-filled float, which ensures positive buoyancy of the dispenser in water. The sleeve is ballasted to ensure that the dispenser is vertically disposed in the water.

3 Claims, 3 Drawing Figures

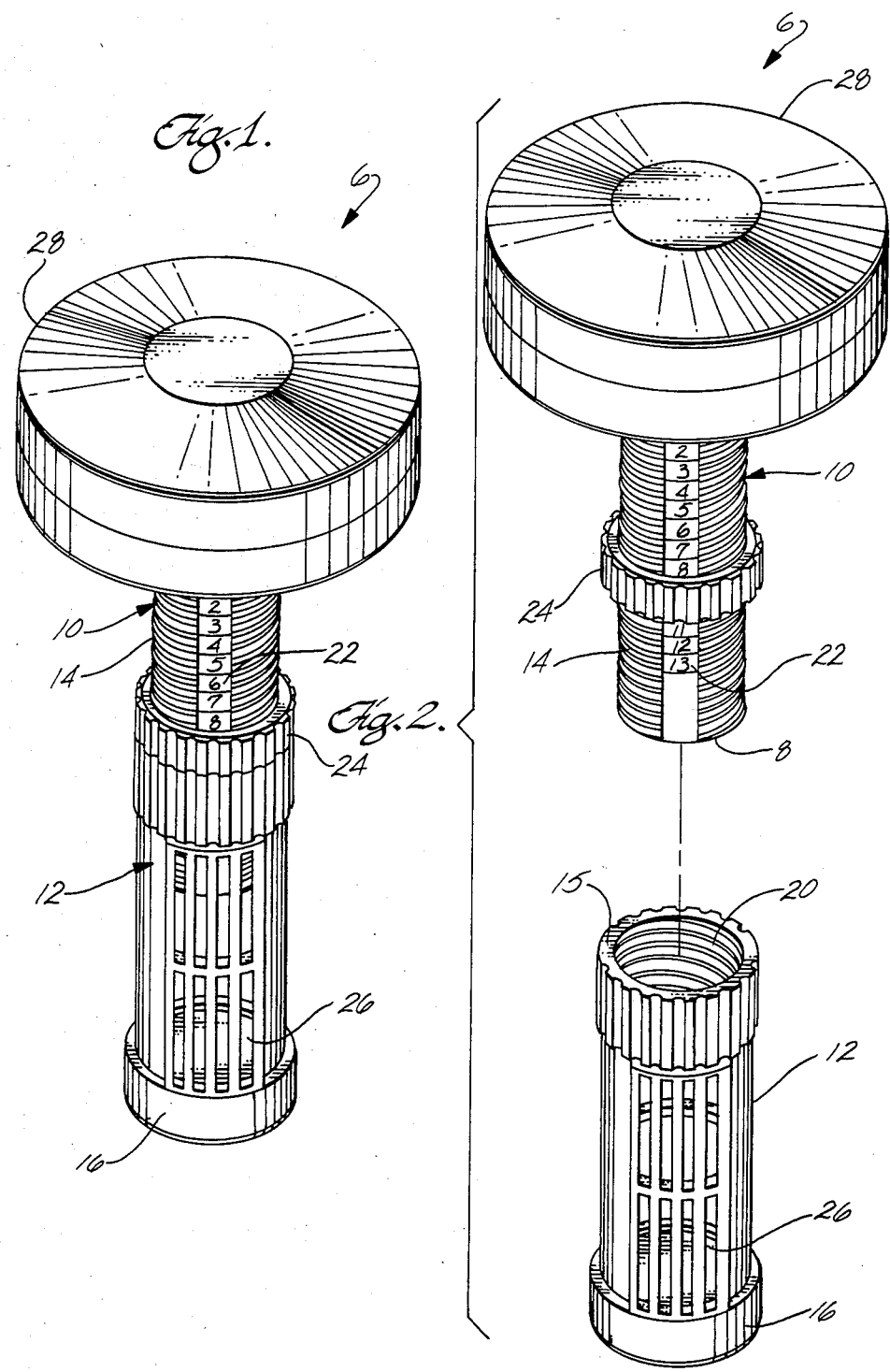

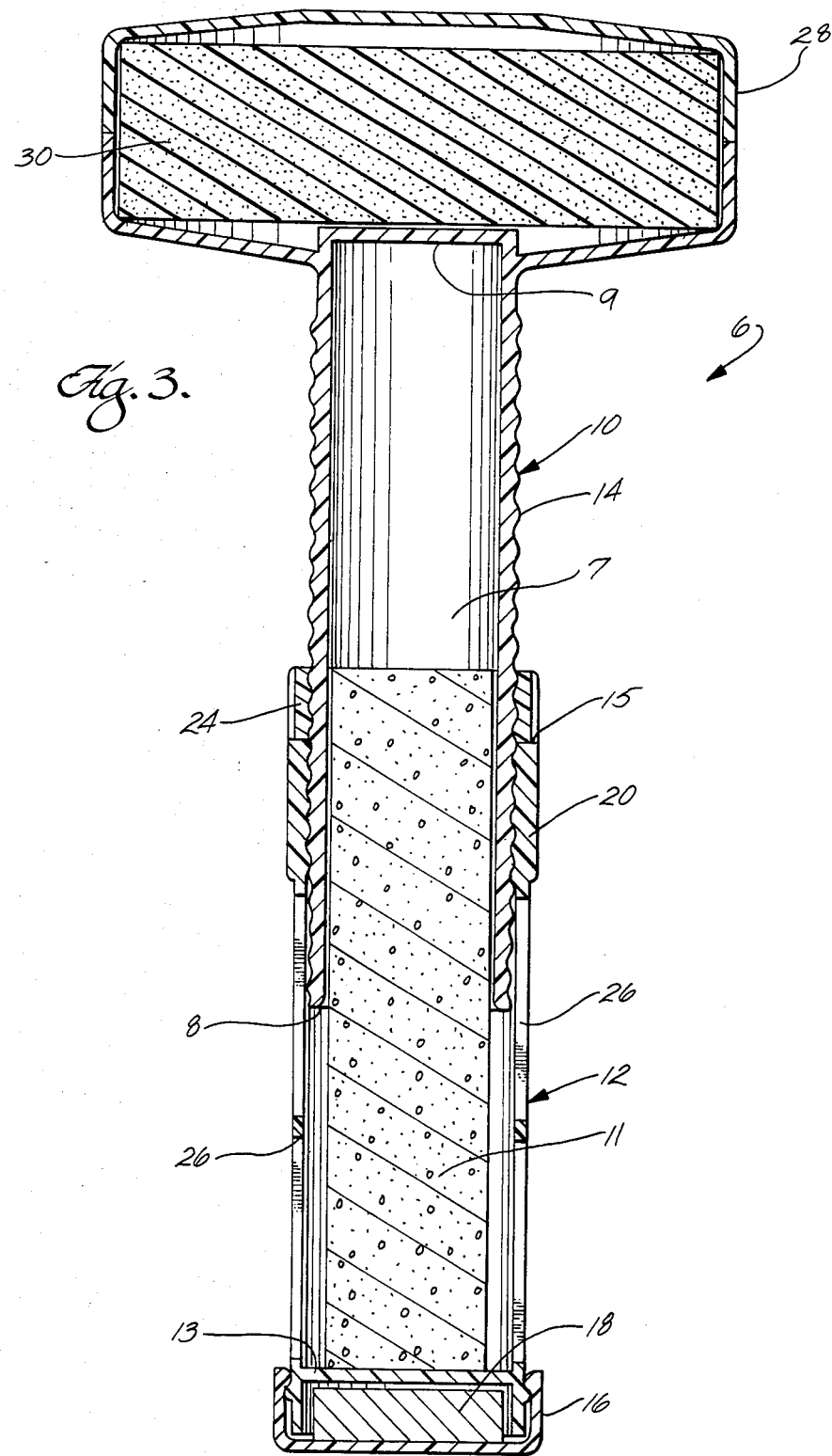

SOLID CHLORINE DISPENSER FOR SPAS

FIELD OF THE INVENTION

This invention relates to a device for dispensing a soluble solid source of chlorine or other halogen in a spa, hot tub or swimming pool.

BACKGROUND OF THE INVENTION

Unless controlled, the water in swimming pools, spas, hot tubs, and the like can become contaminated with algae and similar organisms. The contaminant growth is usually controlled by the addition of chlorine to the water. The amount of chlorine required to maintain the water in a substantially organism-free state depends on the size of the pool or spa, the climatic conditions, the temperature of the water, and the extent of use of the pool or spa. The hot water found in spas and hot tubs necessitates the frequent addition of chlorine, because the material added rapidly loses effectiveness. A device that can be placed in the water to dispense chlorine in controlled amounts relieves the spa owner of the necessity of regularly monitoring and maintaining the chlorine content of the water.

Chlorine dispensing devices exist for swimming pools. One such device, among many, is the Rainbow Plastics Model 330 floating dispenser for solid chlorine. This dispenser resembles an inverted hollow truncated cone. The interior serves as a receptacle into which granular pellets of water-soluble chlorine material are placed. Around the circumference of the receptacle adjacent to the bottom there are apertures consisting of elongated vertical slots. The slots cooperate with a similarly slotted sleeve around the exterior of the container. The sleeve can be adjusted so that the slots are fully closed, fully opened, or in between. The top of the receptacle is closable by a lid. The walls of the container are hollow and are filled with closed-cell plastic foam. The cavity in which the foam is located is hermetically sealed. When filled with a soluble solid source of chlorine or bromine ions and floated in a swimming pool, the pool water contacts the source material in the receptacle to dissolve the source material, thereby releasing the active constituent of the material into the water. The rate at which such solution and release occurs is regulated by the extent to which the apertures in the receptacle are opened or closed by the position of the adjustment sleeve on the exterior of the receptacle. This dispenser is not conveniently usable in a spa because the effective size of the apertures cannot be regulated precisely enough to prevent the dispenser from over-chlorinating the spa water which, by reason of its temperature, acts more rapidly on the source material than the usually cooler water in a swimming pool. Also, this dispenser has a relatively large capacity for containing the source material so that, even when its apertures are very nearly closed, substantial quantities of source material are wetted and dissolved.

Other prior art products include cumbersome floating structures, each receiving a non-openable replaceable cartridge that contains the slowly soluble source of chlorine or other halogen. The exterior of the cartridge contains ribs which cooperate with the slots in the large float to hold the cartridge in a selected position vertically relative to the float. The containers are molded with bumps axially spaced along the container adjacent to the bottom end and a single bump adjacent to the top end. The user cuts off one or more bottom bumps to define the extent to which water communicates with the inside of the container, and cuts off the top bump to provide air communication to the inside of the container. The container is then placed into the large float and the resulting assembly is placed in the pool. Water then fills the cartridge to the waterline of the floating assembly; the vertial position of the cartridge in the float determines the extent to which the cartridge contents are wetted.

There are several practical difficulties with these last products. They are quite large and so do not fit well into a spa or hot tub. Their size makes them cumbersome to remove from the spa when the spa is to be used. They are aesthetically unappealing. They cannot reliably be adjusted to provide the precise solution rates needed for efficient chlorination (halogenation) of spas and hot tubs because of the crude and imprecise manner in which communication of water to the interior of the cartridge is provided. The are essentially floating packages of halogen source material designed by major source material manufacturers whose purpose is to market source material; the user cannot change source material without changing the entire dispenser; the user cannot use any source material he wishes.

In a dispenser for spas, it is important that the rate of solution of the source material be precisely controllable over a range commensurate with the lower chlorination requirements of spas as compared to swimming pools. The dispenser should not be too bulky so as not to create an obstruction in the spa. The dispenser should enable the user to select, as he chooses, from among many commercially available source materials. Finally, the dispenser should be made of a material resistant to damage from prolonged exposure to sunlight and chemicals.

SUMMARY OF THE INVENTION

This invention provides a floating device for dispensing into a body of water a solution of desired nature created by the action of water on a suitable solid material in the device. The dispenser device is well suited for dispensing biologically active halogen into a spa or hot tub with a degree of precision not achievable with devices heretofore available. The dispenser is compact, aesthetically attractive, long lasting, easily fillable and precisely adjustable, and is effective and efficient. The dispenser can be used with soluble source material of diverse manufacture, thus giving the user freedom to select the source material he deems best for his needs. The dispenser is especially useful with source materials provided in tablet or stick form.

Generally speaking, the dispenser of this invention comprises a tubular body for receiving a quantity of the solid to be dissolved. The body has a closed end and an open end and is adapted to be vertically disposed in the water with its open end down. A sleeve has an open end in which the open end of the body is disposable and axially movable. The sleeve has a closed end and apertures through its walls adjacent the closed end. Means are provided for securing the sleeve in a desired location axially of the body within a range of such locations. Also, means are provided for causing the combination of the body, the sleeve, and contents of the body and sleeve to have positive buoyancy in water and to float with the body in a vertical attitude.

To use the dispenser, the sleeve is removed from the body, which is then inverted and loaded with a solid source of chlorine or other product. The sleeve is then threaded onto the body and fixed at the desired position. The dispenser is turned so that a ballasted end of the sleeve points downward and is dropped into the spa. An air pocket forms inside the body and water thus rises inside the body only to the extent permitted by the degree of immersion, not to the waterline at which the dispenser then floats. Consequently, the portion of the soluble solid in contact with water at any time depends on the degree of closure of the slots, which in turn determines how much of the source material will be below the trapped air bubble in the body. The adjustable effective size of the slots determines the rate at which water can circulate past the source material at act upon it and to dissolve the material so as to release the desired biologically active ions of chlorine or other halogen. Thus, the rate at which the solid dissolves can be precisely controlled.

As used herein, unless the sense of the usage indicates otherwise, the term "chlorine" refers to any suitable halogen (chlorine, bromine, iodine, or fluorine), and "chlorinate" or "chlorination" also means "halogenate" or "halogenation," respectively.

DETAILED DESCRIPTION OF THE DRAWINGS

FIG. 1 is a perspective drawing of the assembled dispenser;

FIG. 2 is a perspective drawing of the dispenser in a disassembled state; and

FIG. 3 is a vertical cross-section of the assembled dispenser shown in FIG. 1.

DETAILED DESCRIPTION

FIGS. 1 and 2 show a presently preferred solid chlorine dispenser 6. The chlorine source or other soluble solid 11 (see FIG. 3) is contained within a chamber 7 defined by a tubular body or container 10 disposed within a sleeve 12. The container has an open lower end 8 and a closed upper end 9. It includes external threads 14 around its circumference along its entire length.

Sleeve 12 has a closed lower end 13, which is fitted with a cap 16. As can be seen in FIG. 3, the cap cooperates with the extreme lower end of the sleeve to define a cavity in which is housed a lead disk 18 which serves as ballast for the dispenser. Adjacent to an open upper end 15 the sleeve defines internal threads 20. The internal threads on the sleeve cooperate with external threads 14 on the container. The position of the sleeve axially on the container can thus be precisely controlled.

The exterior of the container includes numerically designated gradations or other suitable indicia 22 to assist the user in determining the correct position of the sleeve on the container.

A locknut 24 is threaded onto the container. The locknut cooperates with the external threads on the container and with the open end of the sleeve to secure the axially adjusted position of the sleeve on the container. Although a nut is preferred, other means for securing a given position of the sleeve on the container may be employed.

The walls of the sleeve define two sets of elongated slots or apertures 26, located diametrically opposite to each other. The slots extend along the sleeve from its closed lower end to adjacent its internally threaded upper end. The slots allow water to communicate between the interior and exterior of the sleeve. The slots can be fully opened or fully closed or anywhere in between; the degree of closure is regulated by the position of the sleeve on the container and secured by the position of the locknut.

The closed end of container 10 is attached to a hollow pancake-shaped float 28 having a diameter greater than the diameter of the container. FIG. 3 shows that the float is filled with a foam-like material 30. The foam-like material ensures that the dispenser has positive buoyancy in water and does not sink. Closed-cell foam rather than sponge-like foam is a preferred filling.

The foam-filled float and the ballasted sleeve cooperate to ensure that the container and sleeve combination remains vertically disposed below water level. The device thus has spar-type geometry. If the device was not ballasted, it could float horizontally, and the access of water to the chamber formed by the sleeve and the container could not be precisely controlled.

To use the dispenser, the user disassembles the container and sleeve, inverts the container and loads it with solid chlorine granules, sticks or tablets. The sleeve is then threaded onto the container and axially adjusted at the desired position on the stem. The dispenser is turned upright, i.e., the float is above the container and sleeve combination and is placed in the spa or hot tub. Because the lower end of the sleeve is ballasted, the product floats in a fully upright position with only the pancake-type float visible.

The chamber formed by the container and sleeve has no opening to the atmosphere at its upper end; the only opening is at the lower end. Consequently, when the dispenser is immersed in water, an air pocket forms at the upper end of the container. For the air pocket to form, it is important that the device be dropped into the water in an upright position. Water rises inside the container only to the extent permitted by the degree of immersion of the dispenser. The air pocket ensures that only the bottom portion of the soluble material inside the dispenser is in contact with the water in the spa; after the material dissolves, the remaining material also becomes accessible to contact with water. The amount of material accessible to the water and therefore the rate at which it dissolves depends on the degree of closure of the apertures. The high degree of adjustability of the size of the apertures thus enables the user to exert a very precise control over the amount of chlorine source material that is in contact with the water, and therefore over the rate at which the source material dissolves.

It is contemplated that the dispenser will be primarily used by owners of small spas, hot tubs, or jacuzzis. However, the dispenser could also be used to chlorinate a small swimming pool. Since more chlorine is necessary to chlorinate a pool than a spa, the sleeve and the container would be filled with the solid chlorine source to the greatest extent possible and the dispenser would be assembled with the container only slightly threaded onto the sleeve. The user then would immerse the product in a swimming pool in an inverted state so that there would be no air bubbles trapped inside the dispenser. After the user releases the dispenser, it floats in an upright state. Since there are no air bubbles inside the dispenser, all the chlorine source material would be wetted, and would dissolve faster to meet the greater chlorination requirements of a swimming pool.

Chlorine granules, sticks or tablets are presently the most commonly used means of controlling organism growth in spas and hot tubs. However, the dispenser can also be used with any other suitable solid. For instance, bromine sticks can be used to brominate the pool or spa.

In the preferred embodiment, the dispenser is injection-molded of a rigid polyethylene materials. However, other injection-moldable resins such as polypropylene or vinyl may also be suitable. Polyethylene is quite chemically-resistant and thus resists cracking due to prolonged exposure to sunlight and chlorinated water. Manufacturing processes other than injection molding may be used to define the dispenser.

Workers skilled in the art to which this invention pertains will recognize that the foregoing description, presented with reference to the presently preferred embodiment of the invention, is illustrative and not exhaustive of all forms which apparatus embodying the invention may take. Thus, the following claims are to be construed and interpreted consistent with the illustrative nature of the preceding description.

What is claimed is:

1. A reusable device for dispensing a solution derived from a solid into a body of water, comprising:

a tubular container having a closed end and an open end;

a sleeve having one closed end and one open end threadable at the open end thereof onto the open end of the container so that the sleeve and the container define a chamber of variable length for receiving the solid;

apertures in the walls of the sleeve proximately adjacent to the closed end of the sleeve where the degree of closure of the apertures is variable from a fully closed position to a fully open position dependent upon the location of the sleeve axially on the container;

a float member larger in diameter than the container filled with foam attached to the container at the closed end thereof;

ballast contained within the sleeve adjacent the closed end thereof;

the float member, ballast and structure and material of the container and sleeve being cooperatively defined to cause the device to float erect, with the sleeve closed end down, irrespective of the quantity of solid in the chamber and irrespective of the presence or absence of air in the chamber above the open end of the container; and a nut cooperable between the container and the sleeve for securing the sleeve in a desired location on the container.

2. A device as claimed in claim 1, wherein the float member is hollow and is filled with closed-cell foam material.

3. A device as claimed in claim 1, further comprising indicia on the sleeve for indicating the position of the sleeve on the container.

* * * * *